Jan. 31, 1961  J. W. ERICKSON  2,970,234
VENTILATING SYSTEM FOR A DYNAMOELECTRIC MACHINE
Filed Jan. 24, 1958
Fig. 1.
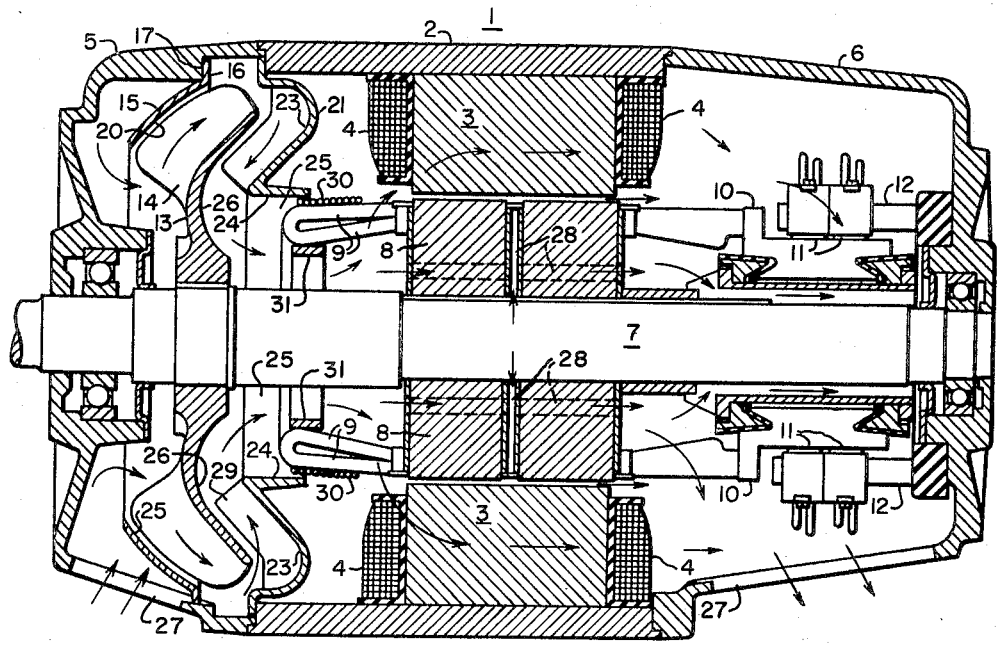
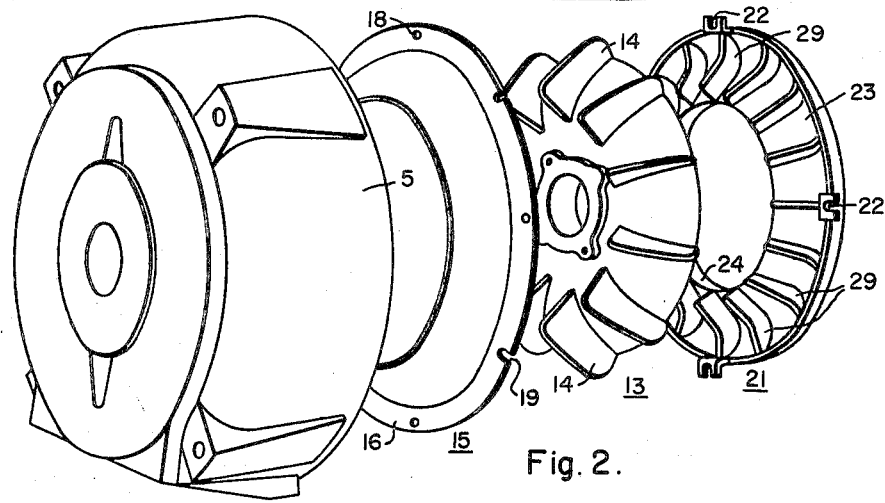
Fig. 2.
WITNESSES:
Bernard R. Gieguey
Ernest P. Klippel
INVENTOR
John W. Erickson
BY J. P. Lyle
ATTORNEY United States Patent Office 2,970,234
Patented Jan. 31, 1961

2,970,234

VENTILATING SYSTEM FOR A DYNAMO-ELECTRIC MACHINE

John W. Erickson, East Aurora, N.Y., assignor to Westinghouse Electric Corporation, East Pittsburgh, Pa., a corporation of Pennsylvania Filed Jan. 24, 1958, Ser. No. 710,893

4 Claims. (Cl. 310—63)

My invention relates to ventilating systems for dynamoelectric machines and particularly to an improved cooling means for such a machine.

The performance of any given dynamoelectric machine is limited, among other things, by the ability of its ventilating system to carry heat away from parts most likely to suffer permanent damage because of excessive temperature rise. Many dynamoelectric machines are applied in dusty, damp or abrasive laden atmospheres which tend to introduce foreign substances into the machine where they may be deposited and retard effective cooling by laying a heat insulating barrier over the interior of the machine. Ventilating passages can also be obstructed by a build up of foreign matter within the machine, thereby causing the machine to overheat.

It is customary to place fans on the rotating member or armature which produce a forced circulation of air across the armature and stator frame so as to carry heat away from the internal parts of the machine. At the same time, foreign material tending to settle and adhere to the machine parts is sought to be expelled from the interior of the machine.

The principal object of my invention is to provide a dynamoelectric machine with improved ventilation.

Another object of my invention is to provide a dynamoelectric machine with a greater flow of ventilating air to places where it will be most effective within the machine.

Another object of my invention is to provide a dynamoelectric machine in which the amount of foreign materials deposited within the machine is reduced or substantially eliminated.

Other objects and advantages of my invention will be apparent from the following detailed description, taken in connection with the accompanying drawings, in which:

Figure 1 is a cross-sectional view of an illustrative embodiment of my invention in a dynamoelectric machine; and Fig. 2 is an exploded perspective view of the component parts making up my new ventilating system.

The invention is applicable to any type of dynamoelectric machine but is shown in the drawing as embodied in a direct current motor. The machine shown for the purpose of illustration has a stator member 1 comprising a stator frame 2 supporting pole pieces 3 and field winding 4. The stator frame 2 is closed at one end by an air intake end bell 5 and at the opposite end by an air exhaust end bell 6. Means are provided in the end bells 5 and 6 for rotatably supporting a rotor member 7 comprising an armature 8 with an armature winding 9 and commutator 10. Brushes 11 ride on the commutator 10 and are supported from the stator member 1 by brush rigging 12 of any suitable type.

In accordance with the present invention, a centrifugal fan 13 with generally radial blades 14 mounted on an imperforate back plate 14A is coaxially mounted on the rotor member 7 and adapted to draw ventilating air into the machine from the end opposite the commutator 10.

An annular baffle 15 is concentrically disposed around the inner circumference of the air intake end bell 5 and is fastened thereto by a flange 16 engaging a shoulder 17 on the air intake end bell 5 by any suitable means. Bolt holes 18 and slots 19 on the flange 16 are shown to illustrate the fastening means. It can be seen that the annular baffle 15 is shaped to form a substantially concave surface 20 on the inlet side of the fan 13 and radial blades 14. In such a manner the annular baffle 15 provides guiding means directing the ventilating air to the inlet of the centrifugal fan 13 for maximum fan efficiency.

A second annular baffle 21 is axially displaced inward from the first annular baffle 15 and disposed on the discharge side of the fan 13. The second annular baffle 21 is secured to the stator member 1 by suitable means herein shown as lugs 22. The second baffle 21 has a substantially concave side 23 which faces the first baffle 15. As shown in the drawing, the second annular baffle 21 radially overlaps the discharge side of the centrifugal fan 13. The second baffle 21 also has a reentrant cylindrical surface 24 which is concentric with the rotor member 7 forming a restricted passageway 25 therewith. The centrifugal fan 13 is mounted between the first annular baffle 15 and the second annular baffle 21. The substantially concave side 23 of the second annular baffle 21 provides means for directing ventilating air discharged by the centrifugal fan 13 back against the discharge side of the centrifugal fan 13 which is formed as a solid concave surface indicated at 26; that is, a surface with no openings through it and capable of functioning as a baffle.

It is to be noted that the concave surface 26 is radially displaced inward from the concave side 23 of the second baffle 21. The concave surface 26 is adapted to direct the ventilating air channeled to it by the second substantially concave side 23 so that the ventilating air is forced through the restricted passageway 25 and through the coil support 31 into the interior of the rotor member 7. The air then passes through the usual passageways 28 in the rotor member 7 while some air flows through the end turns of the windings 9 in the spaces between the banding 30 and the armature core 8.

In operation, the flow of ventilating air through the machine is as indicated by the arrows. The centrifugal fan 13 draws ventilating air through openings 27 in the air intake end bell 5. The air discharged by the fan 13 is directed by the substantially concave side 23 towards the substantially concave surface 26 on the discharge side of the centrifugal fan 13. The concave surface 26 acts as a baffle to direct the ventilating air through the restricted passageway 25 which directs the air into and through the armature 8 and armature winding 9. The ventilating air travels over and through the stator member 1 and rotor member 7 through the passageways 28. The ventilating air is discharged through openings 27 in the air exhaust end bell 6 after passing over the commutator 10 and brushes 11.

Vanes 29 are radially disposed on the concave side 23 to prohibit circumferential swirling of the air along the concave side 23 due to the action of the centrifugal fan 13. The ventilating air received from the centrifugal fan 13 is evenly divided and channeled by the vanes 29 to the discharge side of the fan 13. The movement of the centrifugal fan 13 relative to the vanes 29 and the second annular baffle 21 slightly compresses the ventilating air. This action of the fan 13 moving over the second annular baffle 21 raises the pressure of the ventilating air so that the air directed to the concave surface 26 and hence through the restricted passageway 25 is slightly pressurized in comparison with the air in the remainder of the system. The restricted passageway 25 serves to control the flow and direction of the ventilating air along the armature 8 so that the armature 8 is within the area where the ventilating air pressure is greatest. In this manner, the most cooling air possible is directed where it is needed most.

It can be seen that the second annular baffle 21 acts as a diffuser which not only equally divides the ventilating air coming into the dynamoelectric machine but channels the air to a concave surface 26 on the discharge side of the centrifugal fan 13. From there it is directed through the restricted passageway 25 with relatively high pressure providing maximum ventilating air flow through and over the armature 8 where the heat generation and hot spots are most critical. With greater air pressure there is a greater flow of ventilating air in the critical temperature area of the machine. Foreign material will have less opportunity to settle and interfere with the proper conduction of heat away from this area. Further, the ventilating air is directed and concentrated where it is needed most, namely, the armature 8 and armature winding 9. The restricted passageway 25 controls the flow of ventilating air to the rotor member 7 and stator member 1 so as to keep the pressure of the ventilating air relatively high around the armature 8 and the armature winding 9.

It is now readily apparent that my ventilating system provides a greater cooling effect particularly where it is most needed within the machine. The effectiveness of the controlled ventilating system allows the use of appreciably les ventilating air than previously required to maintain the same safe operating temperatures therein. With the same amount of air used in conventional designs, the rating of a motor of given size can be increased without exceeding the maximum temperature limits. In either case less foreign material is introduced into the machine. The directed pressure and flow of the ventilating air will not allow foreign material to settle in parts of the machine which are most critically in need of heat transfer to the ventilating air.

The centrifugal fan 13 discharges into the interior of the machine and as a result is more quiet operating than systems which discharge into the atmosphere. Further, the direction of flow of the ventilating air is such that carbon dust from the commutation of the machine will be directed out of the motor rather than through the motor where it could interfere with proper heat conduction and be detrimental to insulation life. Any foreign material drawn into the machine does not strike the commutator directly.

A ventilation system has been provided which positively directs the ventilating air into the armature and stator frame so that the ventilating air is used to the best cooling advantage. The air is directed and pressurized sufficiently to clean the machine parts rather than allowing contaminants to settle thereon. The hot spots run cooler and insulating surfaces stay cleaner.

Although this invention has been described with a certain degree of particularity, it is to be understood that this present disclosure has been made only by way of example and that numerous changes in the details, combination and arrangement of parts may be accomplished without departing from the spirit and scope of the invention.

I claim as my invention:

1. In a dynamoelectric machine having a stator member and a rotor member, said stator member including a stator frame, an air intake end bell at one end of said stator frame, an air exhaust end bell at the opposite end of said stator frame, a first annular baffle concentrically disposed around the inner circumference of said air intake end bell, said first baffle having a substantially concave surface facing the interior of the machine, a second annular baffle axially displaced inward from said first annular baffle and having a substantially concave side facing said first baffle, said second annular baffle having a reentrant cylindrical surface concentric with said rotor member forming a restricted passageway therewith, a plurality of radially disposed vanes on said substantially concave side of the second baffle, a fan mounted on said rotor member, said fan disposed between said first annular baffle and said second annular baffle and closely adjacent thereto, said fan having a second substantially concave surface facing the interior of the machine and displaced radially inward from said substantially concave side of the second baffle.

2. In a dynamoelectric machine having a rotor member including a rotating shaft, a core, and a winding on said core having end turns extending axially toward the exterior of said machine, a ventilation system comprising a fan mounted on said shaft for rotation therewith, said fan having an imperforate back plate on the discharge side thereof, an annular baffle disposed intermediate said stator member and said fan, said baffle having a cylindrical portion concentric with, in close proximity to and extending axially outward from said end turns, said baffle having a portion extending radially outward from said cylindrical portion, said back plate and said radially extending baffle portion having complementary surfaces closely spaced axially to form a restricted air passage directed toward the central area of said back plate, whereby discharge air from said fan is redirected at high pressure toward the discharge side of said fan and hence toward said rotor member.

3. In a dynamoelectric machine having a rotor member including a rotating shaft, a core, and a winding on said core having end turns extending axially toward the exterior of said machine, a ventilation system comprising a fan mounted on said shaft for rotation therewith, said fan having an imperforate back plate on the discharge side thereof, an annular baffle disposed intermediate said stator member and said fan, said baffle having a cylindrical portion concentric with, in close proximity to and extending axially outward from said end turns, said baffle having a portion extending radially outward from said cylindrical portion, said radially extending portion having a plurality of vanes disposed radially on the side of said baffle adjacent said fan to direct air flow radially, said back plate and said radially extending baffle portion having complementary surfaces closely spaced axially to form a restricted air passage directed toward the central area of said back plate, whereby discharge air from said fan is redirected at high pressure toward the discharge side of said fan and hence toward said rotor member.

4. In a dynamoelectric machine having a stator member including a stator frame and a wound rotor member including a rotor core, a shaft and end turns on the rotor winding projecting axially outward of the rotor core; a ventilation system comprising an annular baffle having a cylindrical portion concentric with, in close proximity to and projecting axially outward from said end turns, said annular baffle including a substantially concave side facing the exterior of said machine extending from said cylindrical portion to said frame, a plurality of radially disposed vanes on said concave side, a fan mounted on said rotor shaft disposed outwardly of said baffle and closely adjacent thereto, said fan having an imperforate back plate, said plate having a substantially concave surface facing the interior of said machine, said surface being centrally disposed on said back plate, said concave surface and said concave side being radially displaced from each other, said back plate and said baffle having complementary surfaces closely spaced axially to form a restricted air passage directed toward the central area of said concave surface, whereby discharge air from said fan is redirected at high pressure toward the discharge side of said fan and hence toward the rotor member.

References Cited in the file of this patent

UNITED STATES PATENTS

| | | |
|---|---|---|
| 1,852,476 | Pfleger | Apr. 5, 1932 |
| 2,604,501 | Wightman | July 22, 1952 |

FOREIGN PATENTS

| | | |
|---|---|---|
| 28,866 | Great Britain | of 1909 |
| 398,640 | France | Mar. 29, 1909 |
| 616,902 | Germany | Aug. 8, 1935 |
| 811,248 | France | Jan. 14, 1937 |
| 288,853 | Switzerland | June 1, 1953 |